United States Patent
Awaya et al.

(10) Patent No.: US 6,378,338 B1
(45) Date of Patent: Apr. 30, 2002

(54) METHOD FOR PRODUCING MAGNETIC DISK SUBSTRATES

(75) Inventors: Kurata Awaya; Kazuyoshi Nishizawa; Kiyoshi Tada, all of Tochigi (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/385,782

(22) Filed: Aug. 30, 1999

(30) Foreign Application Priority Data

Aug. 31, 1998 (JP) .......................................... 10-260932

(51) Int. Cl.⁷ .......................... G11B 5/66; C03C 19/00; C25D 5/00
(52) U.S. Cl. .............................. 65/31; 65/61; 205/162; 205/209; 205/210; 205/211; 205/222; 216/22; 216/97; 134/19; 134/25.4; 134/26; 134/28
(58) Field of Search ....................... 134/1.3, 2, 3, 19, 134/25.4, 26, 28, 30, 34, 36, 41; 216/22, 97; 65/31, 61; 205/162, 209, 210, 211, 222

(56) References Cited

U.S. PATENT DOCUMENTS

| | | | | |
|---|---|---|---|---|
| 4,072,781 A | * | 2/1978 | Shirahata et al. | 428/336 |
| 4,948,460 A | * | 8/1990 | Sandaiji et al. | 156/630 |
| 4,985,306 A | * | 1/1991 | Morizane et al. | 428/410 |
| 5,080,971 A | * | 1/1992 | Yokoyama et al. | 428/336 |
| 5,183,512 A | * | 2/1993 | Bragger | 134/1 |
| 5,405,646 A | * | 4/1995 | Nanis | 427/131 |
| 5,515,214 A | * | 5/1996 | Kiyonaga et al. | 360/97.02 |
| 5,549,211 A | * | 8/1996 | Nakamura et al. | 216/11 |
| 5,618,448 A | * | 4/1997 | Kuroe et al. | 216/97 |
| 5,725,625 A | * | 3/1998 | Kitayama et al. | 65/30.14 |
| 5,895,582 A | * | 4/1999 | Wilson et al. | 216/42 |
| 6,048,466 A | * | 4/2000 | Morizane et al. | 216/24 |
| 6,050,276 A | * | 4/2000 | Harada et al. | 134/121 |
| 6,103,300 A | * | 8/2000 | Yoshida et al. | 427/128 |
| 6,119,483 A | * | 9/2000 | Takahashi et al. | 65/30.14 |

FOREIGN PATENT DOCUMENTS

| | | | | |
|---|---|---|---|---|
| JP | 01211217 A | * | 8/1989 | G11B/5/66 |
| JP | 04291018 A | * | 10/1992 | G11B/5/66 |
| JP | 04295614 A | * | 10/1992 | G11B/5/66 |
| JP | 07-334841 | | 12/1995 | |

* cited by examiner

Primary Examiner—Randy Gulakowski
Assistant Examiner—Jiri Smetana

(57) ABSTRACT

Magnetic disk substrates are produced by subjecting glass substrates to at least steps of degreasing, etching, sensitization with tin chloride, activation and sensitivity-enhancing treatment in that order, then plating the pretreated substrates with a nickel/phosphorus film, and thereafter polishing the plated substrates. In the process, the substrates being processed are washed with hot pure water at a temperature of not lower than 50° C. for a period of from 20 to 90 seconds, after the sensitization step but before the activation step, and heated at a temperature of not lower than 70° C. for a period of from 5 to 100 minutes, after the sensitization step but before the nickel/phosphorus-plating step.

9 Claims, 14 Drawing Sheets

SAMPLE 1 OF EXAMPLE 1 (INVENTIVE EXAMPLE)

Step (a)
```
DEGREASING
(ULTRASONICALLY IN
ETHANOL FOR 10 MINUTES)
```
↓

Step (b)
```
ETCHING
(IN BOROFLUORIC ACID
AT 25°C FOR 5 MINUTES)
```
↓

Step (c)
```
SENSITIZATION
(WITH A SOLUTION OF
TIN CHLORIDE AT 25°C
FOR 30 SECONDS)
```
↓

Step (d)
```
WASHING
(WITH HOT WATER AT 60°C
FOR 30 SECONDS)
```
↓

Step (e)
```
ACTIVATION
(WITH PALLADIUM CHLORIDE
AT 25°C FOR 30 SECONDS)
```
↓

Step (f)
```
SENSITIVITY-ENHANCING
TREATMENT
(WITH BOROFLUORIC ACID)
```
↓

Step (g)
```
HEAT TREATMENT
(AT 80°C FOR 10 MINUTES)
```
↓

Step (h)
```
PLATING A NICKEL/
PHOSPHORUS FILM
(ELECTROLESS Ni-P PLATING)
```
↓

Step (i)
```
POLISHING
```

FIG. 1

SAMPLE 2 OF EXAMPLE 1 (INVENTIVE EXAMPLE)

SAMPLE 3 OF EXAMPLE 1 (COMPARATIVE EXAMPLE)

SAMPLE 4 OF EXAMPLE 1 (COMPARATIVE EXAMPLE)

Step (a)
| DEGREASING (ULTRASONICALLY IN ETHANOL FOR 10 MINUTES) |

↓

Step (b)
| ETCHING (IN BOROFLUORIC ACID AT 25°C FOR 5 MINUTES) |

↓

Step (c)
| SENSITIZATION (WITH A SOLUTION OF TIN CHLORIDE AT 25°C FOR 30 SECONDS) |

↓

Step (e)
| ACTIVATION (WITH PALLADIUM CHLORIDE AT 25°C FOR 30 SECONDS) |

↓

Step (f)
| SENSITIVITY-ENHANCING TREATMENT (WITH BOROFLUORIC ACID) |

↓

Step (d)
| WASHING (WITH HOT WATER AT 60°C FOR 30 SECONDS) |

↓

Step (g)
| HEAT TREATMENT (AT 80°C FOR 10 MINUTES) |

↓

Step (h)
| PLATING A NICKEL/ PHOSPHORUS FILM (ELECTROLESS Ni-P PLATING) |

↓

Step (i)
| POLISHING |

FIG. 4

SAMPLE 5 OF EXAMPLE 1 (COMPARATIVE EXAMPLE)

SAMPLE 6 OF EXAMPLE 1 (COMPARATIVE EXAMPLE)

SAMPLE 1 OF EXAMPLE 2 (INVENTIVE EXAMPLE)

SAMPLE 2 OF EXAMPLE 2 (INVENTIVE EXAMPLE)

SAMPLE 4 OF EXAMPLE 2 (INVENTIVE EXAMPLE)

SAMPLE 5 OF EXAMPLE 2 (COMPARATIVE EXAMPLE)

SAMPLE 6 OF EXAMPLE 2 (INVENTIVE EXAMPLE)

SAMPLE 7 OF EXAMPLE 2 (COMPARATIVE EXAMPLE)

SAMPLE 8 OF EXAMPLE 2 (COMPARATIVE EXAMPLE)

METHOD FOR PRODUCING MAGNETIC DISK SUBSTRATES

The present invention claims priority based on Japanese Patent Application Serial No. H10-260932, the contents of which are incorporated hereinto by reference in its entirety.

BACKGROUND OF THE INVENTION

1. Field of the Invention

This invention relates to a method for producing glass substrates of high-quality crystalline glass or sheet glass, which are for magnetic disks of a high-capacity type and which have good adhesiveness and good impact resistance with no pit.

2. Description of the Related Art

Many magnetic disk substrates produced through bed nickel/phosphorus plating on the surface of an aluminium alloy blank have been used for magnetic recording media for computers. Glass substrates have come to be used for small-sized notebook-type or mobile personal computers. Unlike in the case of aluminium substrates, a magnetic film can be directly applied to glass substrates with no bed plating. However, for realizing glass substrates for magnetic disks with higher memory capacity, studies have been made on a method in which like aluminium substrates, glass substrates are previously plated with nickel/phosphorus and then coated with a magnetic film thereover. Thus using glass substrates in place of aluminium substrates reduces head snapping, as glass substrates are hardly dented against the pressure of heads thereto as compared with aluminium substrates.

As a rule, an ordinary method of electroless plating on non-metallic substrates or oxide or plastic substrates comprises pre-treatment of, for example, adsorbing Sn onto their surface followed by forming a film of a catalytically-active metal (e.g., Pd, Pt or Au) with low hydrogen overvoltage over the Sn coat, as in Japanese Patent Laid-Open Nos. 19932/1978 and 85614/1973. More concretely, the pre-treatment for plating includes, for example, degreasing, etching, sensitization, activation and sensitivity-enhancing treatment. The thus-pretreated surface is then plated with nickel/phosphorus.

The plated substrates are polished with known abrasive grains of, for example, alumina to be those for magnetic disks. The polished substrates are then coated with a magnetic film through sputtering on their mirror-finished surface to be magnetic recording media.

The sensitization pre-treatment for nickel/phosphorus plating on glass substrates is often problematic in that, if the substrates receive too much tin on their surface in the pre-treatment step, the excessive tin will drop off from the surface to be caught by the plating film. As the case may be, the water-soluble oil used for lapping the substrates in the pre-treatment step will remain in the hollows of the lapped substrates. In that case, the substrates shall have pits in their surface.

SUMMARY OF THE INVENTION

Given that situation, the object of this invention is to solve the problems noted above that have heretofore been inevitable in producing plated glass substrates for magnetic disks for which are used various types of glass, such as crystalline glass or sheet glass with high hardness, in place of aluminium. Specifically, the invention is to provide a method for producing glass substrates for magnetic disks which have good impact resistance even for mobile applications and are therefore suitable to small-sized or mobile computers. When used in recent notebook-sized or mobile computers where the head is located as closely as possible to the disk substrate therein, the substrates produced in the invention are not scratched by head snapping around them.

The method for producing magnetic disk substrates of the invention comprises pre-treating glass substrates for at least degreasing, etching, sensitization with tin chloride, activation and sensitivity-enhancing treatment in that order followed by forming a nickel/phosphorus film on their surface and polishing them, and is characterized in that, after the sensitization step but before the activation step, the substrates being processed are washed in hot pure water at a temperature of not lower than 50° C. for a period of from 20 to 90 seconds, and after the sensitization step but before the step of forming a nickel/phosphorus film on their surface, the substrates are heated at a temperature of not lower than 70° C. for a period of from 5 to 100 minutes. The method of the invention solves the problems noted above.

BRIEF DESCRIPTION OF THE DRAWINGS

FIG. 1 is a flow diagram for sample 1 of example 1 in the preferred embodiments;

FIG. 4 is a flow diagram for sample 4 of example 1 in the preferred embodiments;

DESCRIPTION OF THE PREFERRED EMBODIMENTS

Figure 2:
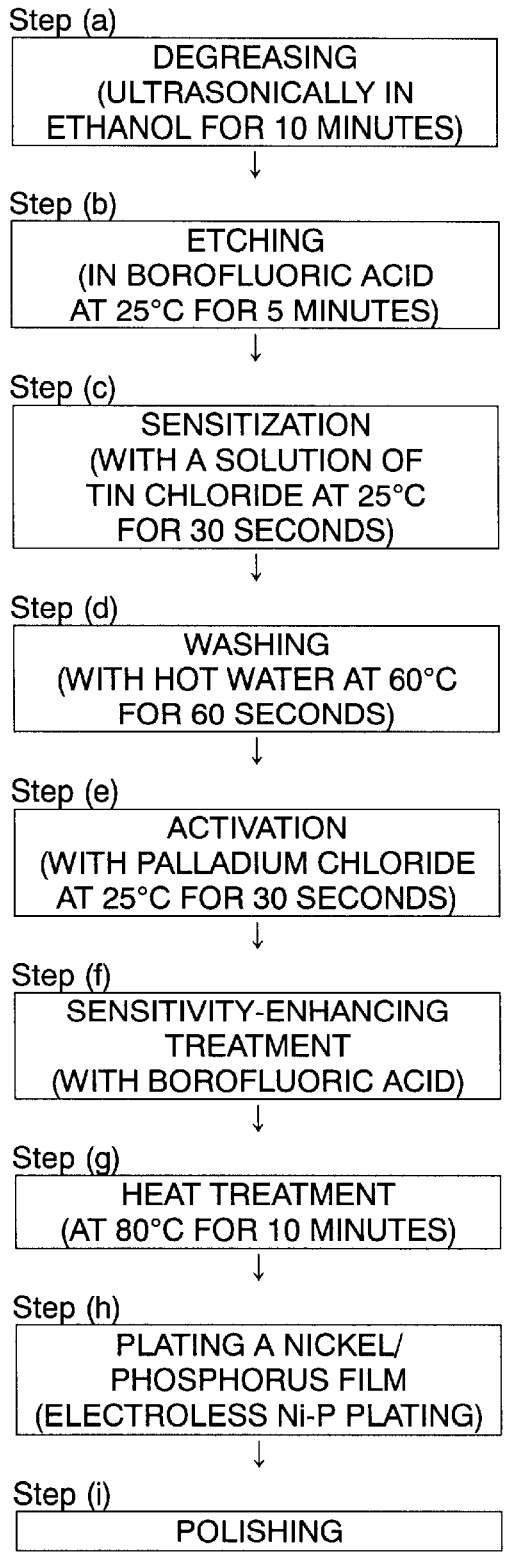
FIG. 2 is a flow diagram for sample 2 of example 1 in the preferred embodiments.
Figure 3:
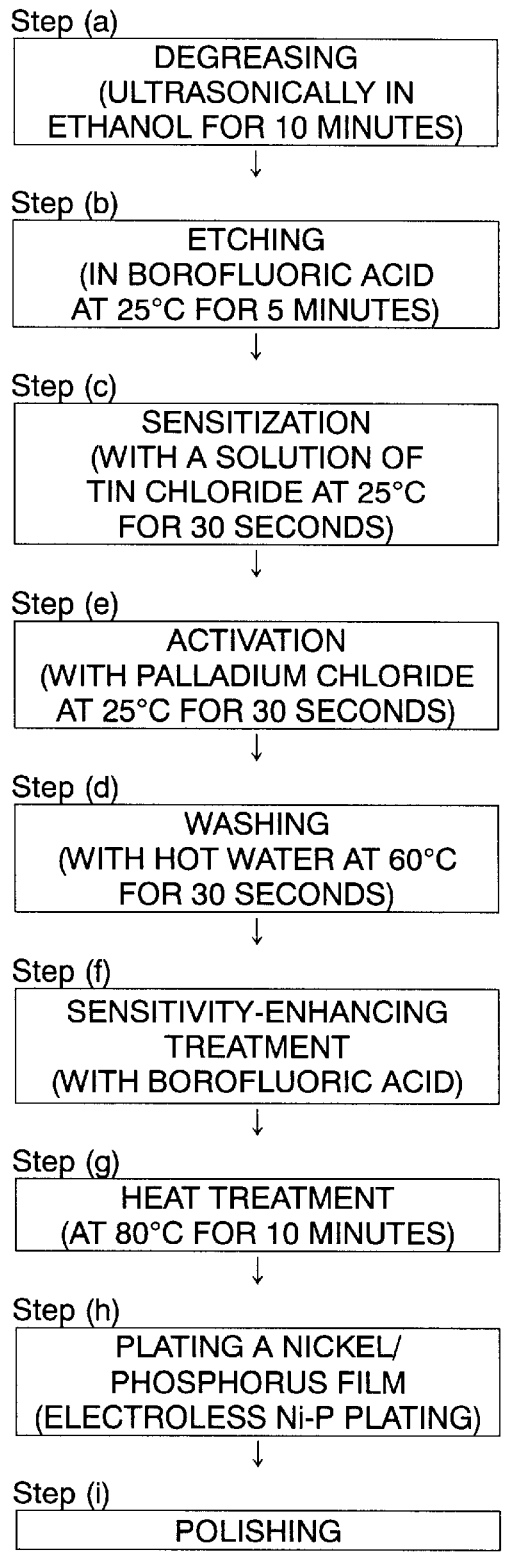
FIG. 3 is a flow diagram for sample 3 of example 1 in the preferred embodiments.
Figure 5:
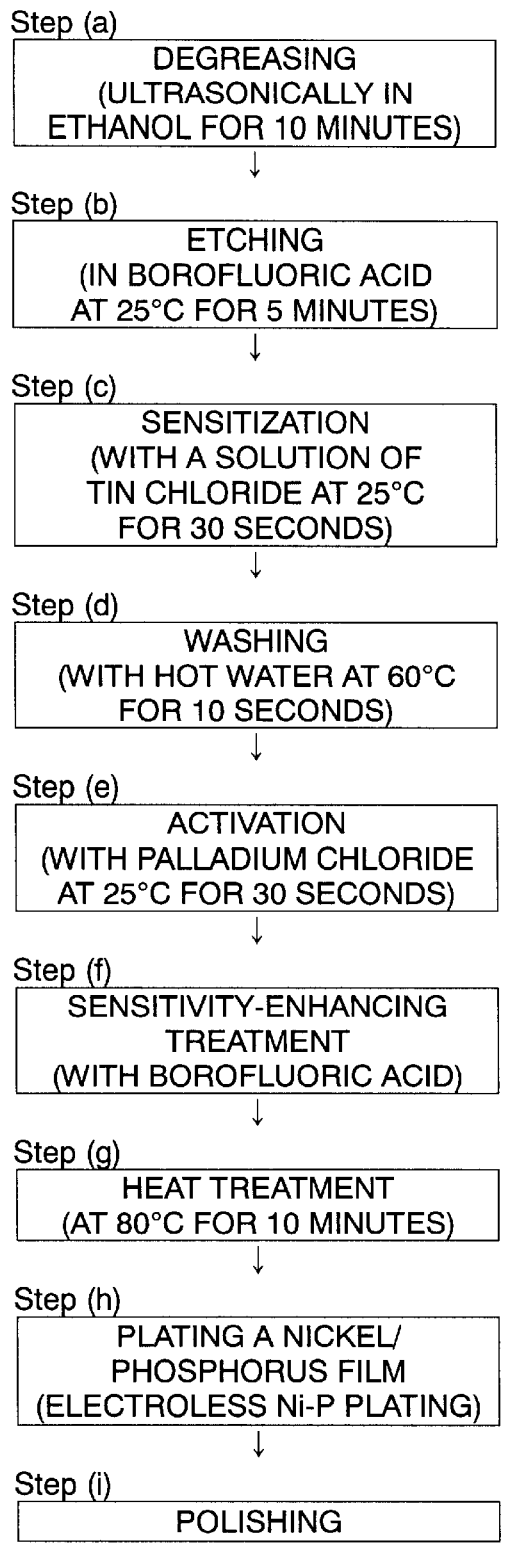
FIG. 5 is a flow diagram for sample 5 of example 1 in the preferred embodiments.
Figure 6:
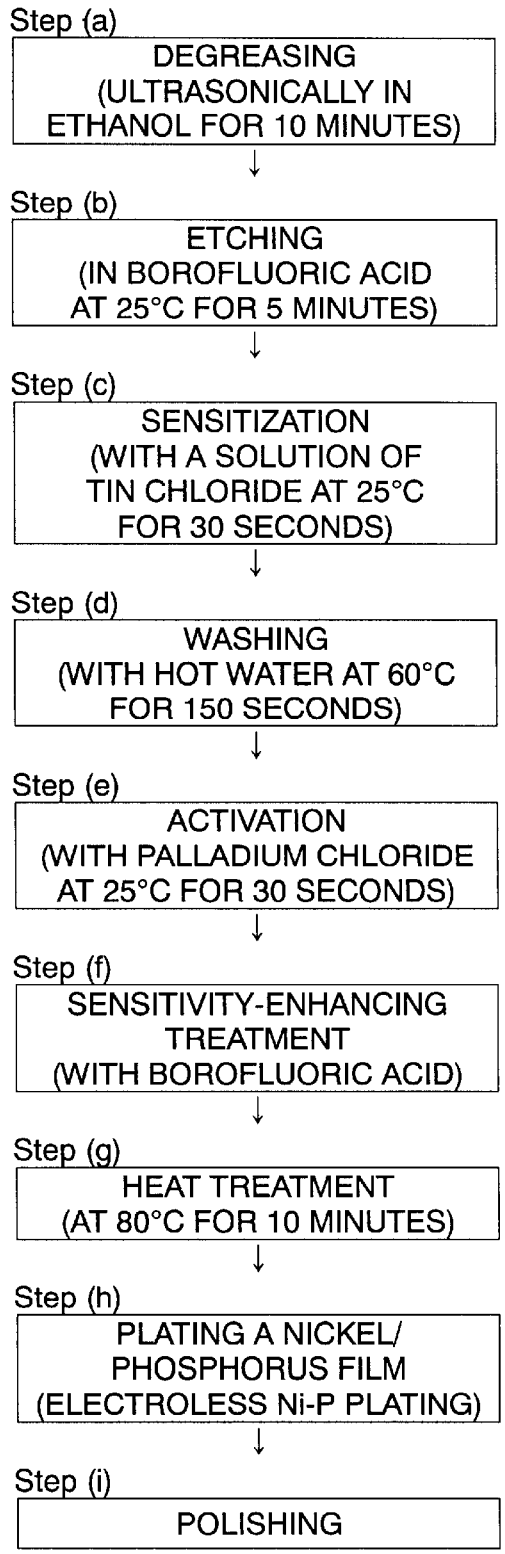
FIG. 6 is a flow diagram for sample 6 of example 1 in the preferred embodiments.
Figure 7:
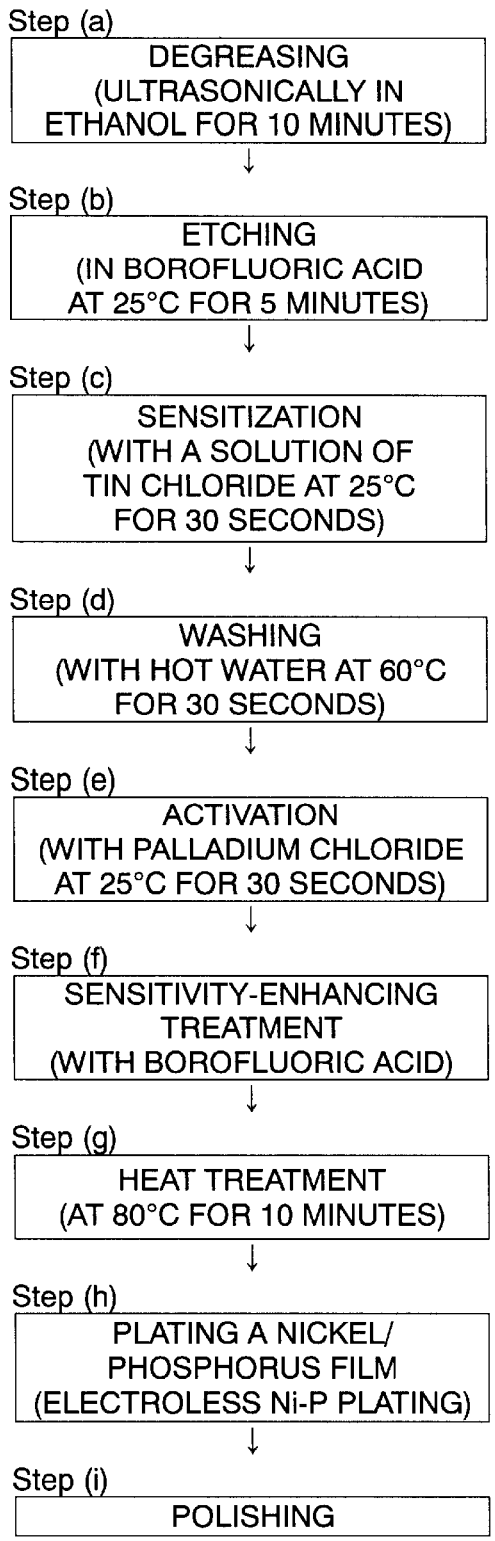
FIG. 7 is a flow diagram for sample 1 of example 2 in the preferred embodiments.
Figure 8:
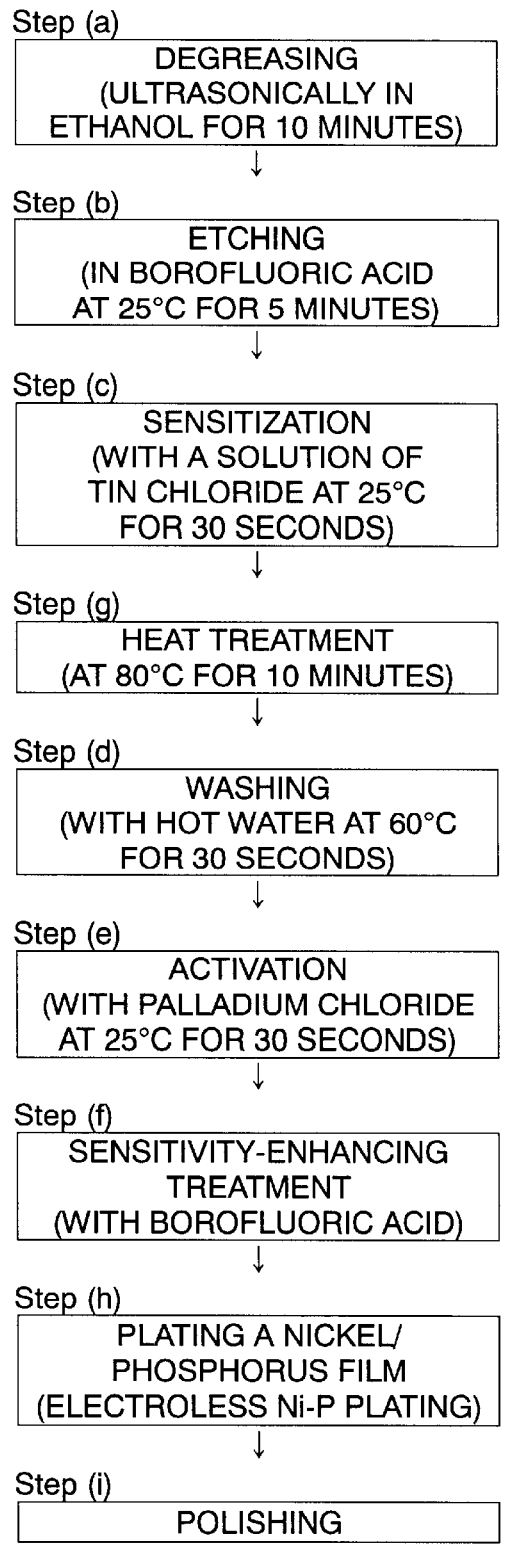
FIG. 8 is a flow diagram for sample 2 of example 2 in the preferred embodiments.
Figure 9:
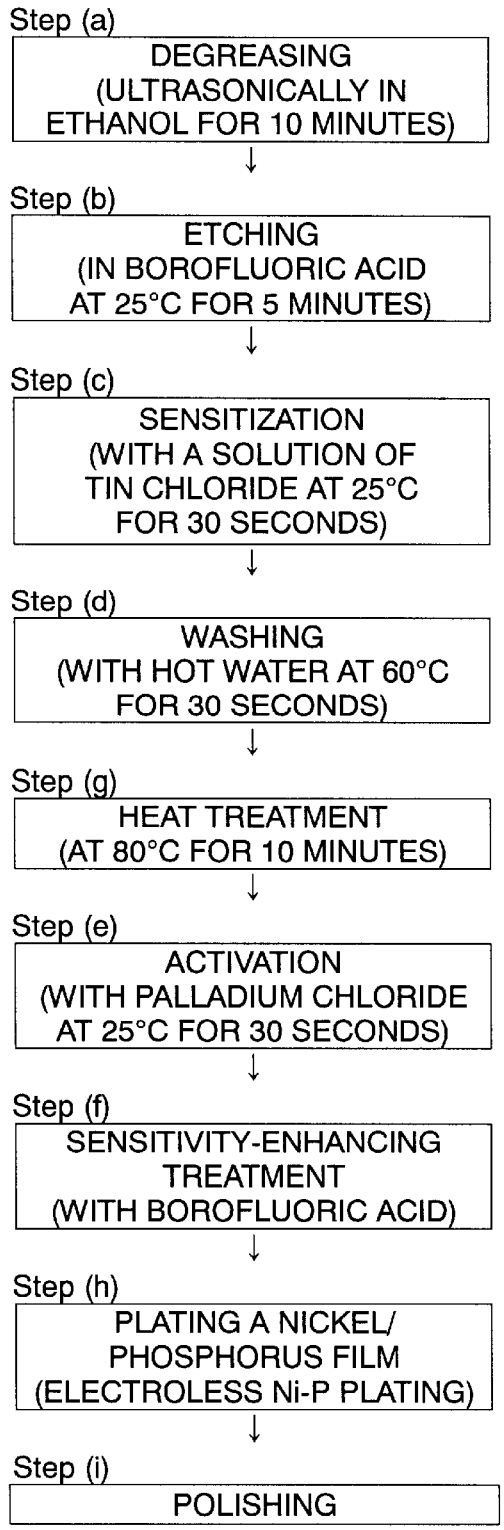
FIG. 9 is a flow diagram for sample 3 of example 2 in the preferred embodiments.
Figure 10:
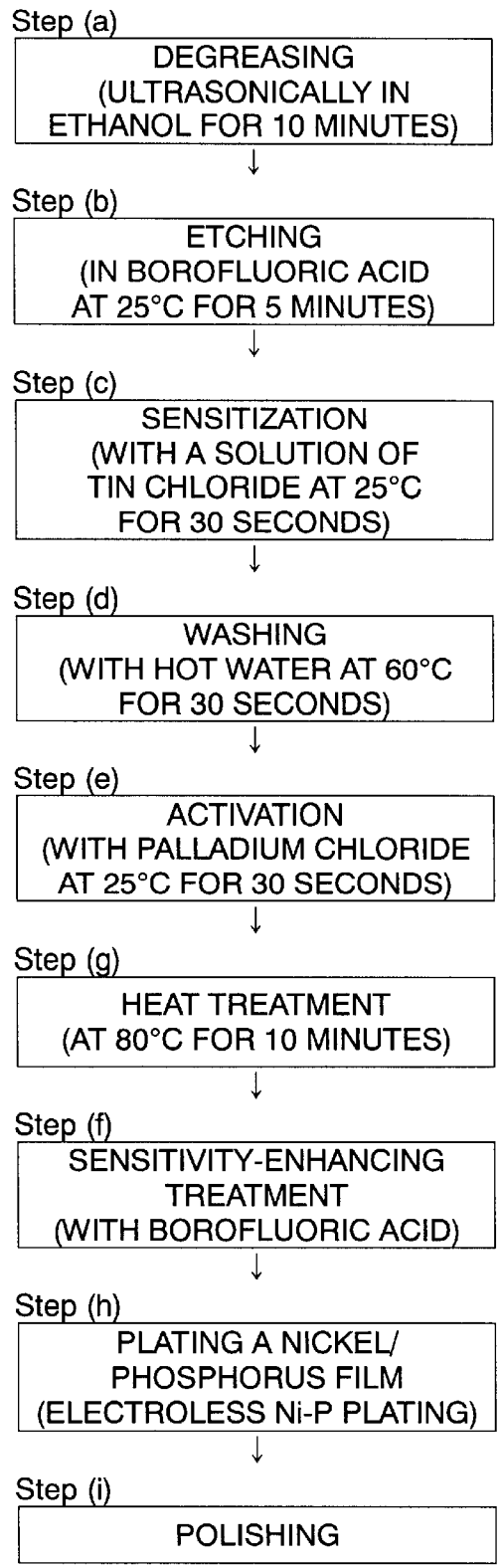
FIG. 10 is a flow diagram for sample 4 of example 2 in the preferred embodiments.
Figure 11:
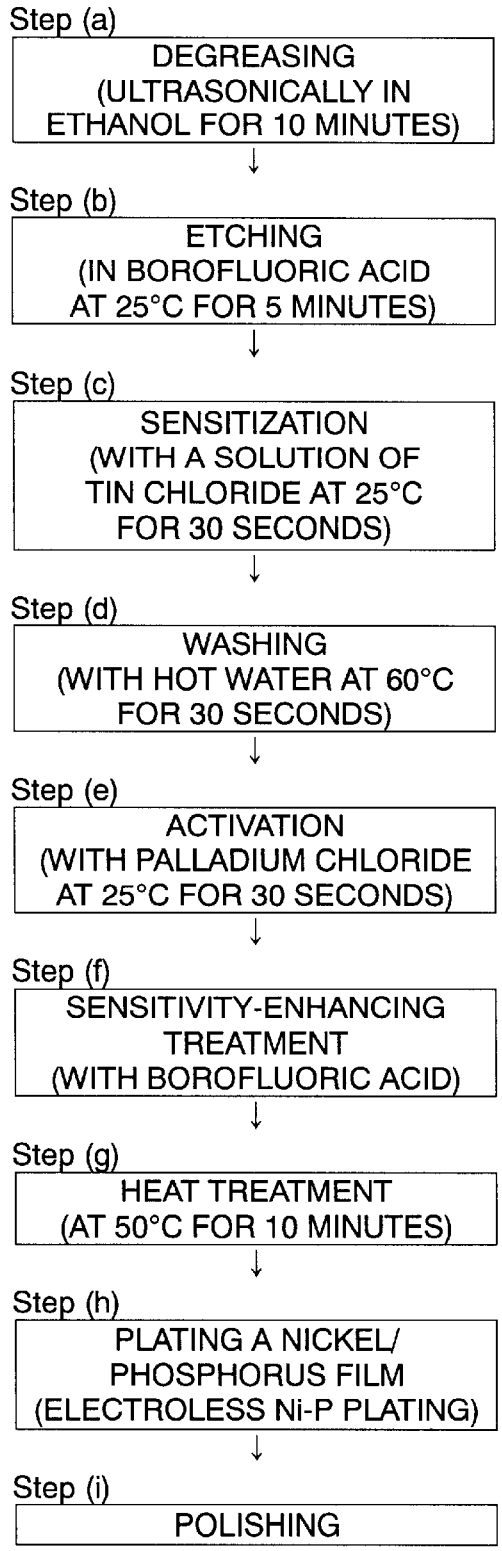
FIG. 11 is a flow diagram for sample 5 of example the preferred embodiments.
Figure 12:
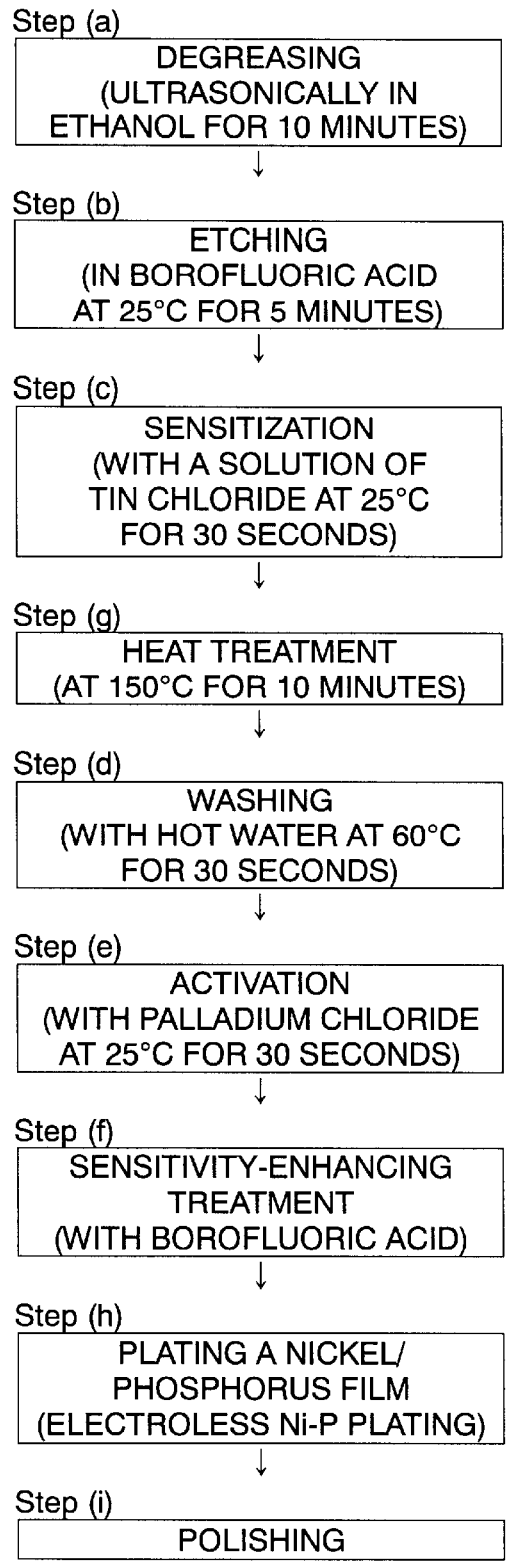
FIG. 12 is a flow diagram for sample 6 of example 2 in the preferred embodiments.
Figure 13:
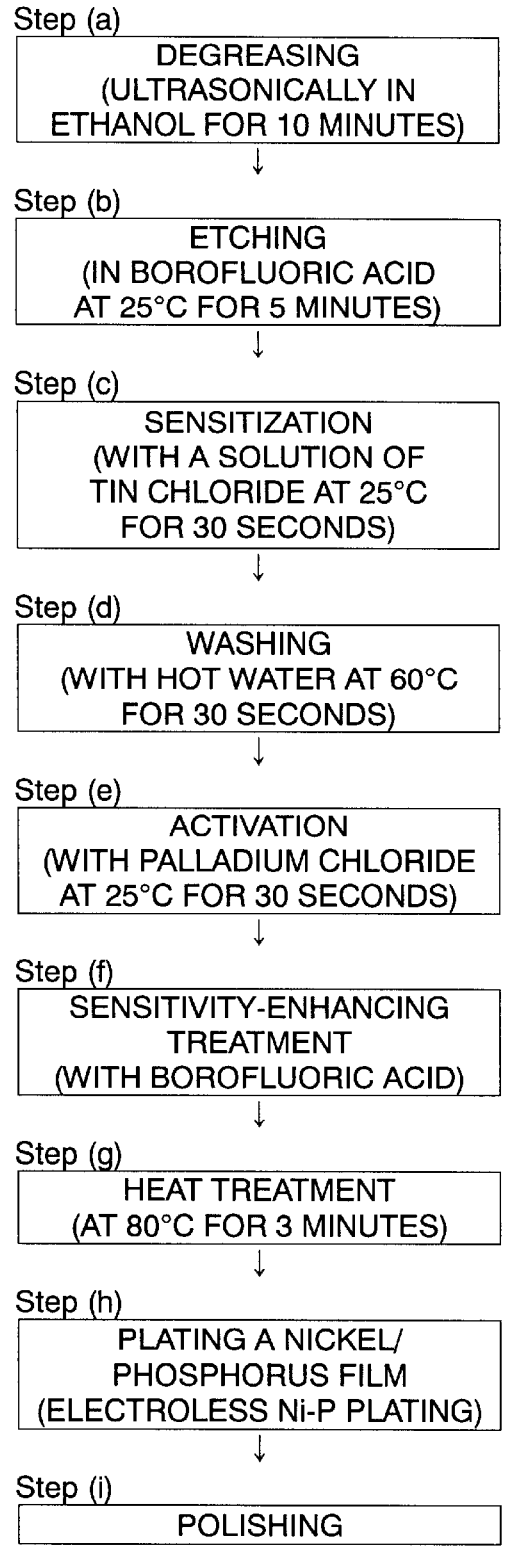
FIG. 13 is a flow diagram for sample 7 of example 2 in the preferred embodiments.
Figure 14:
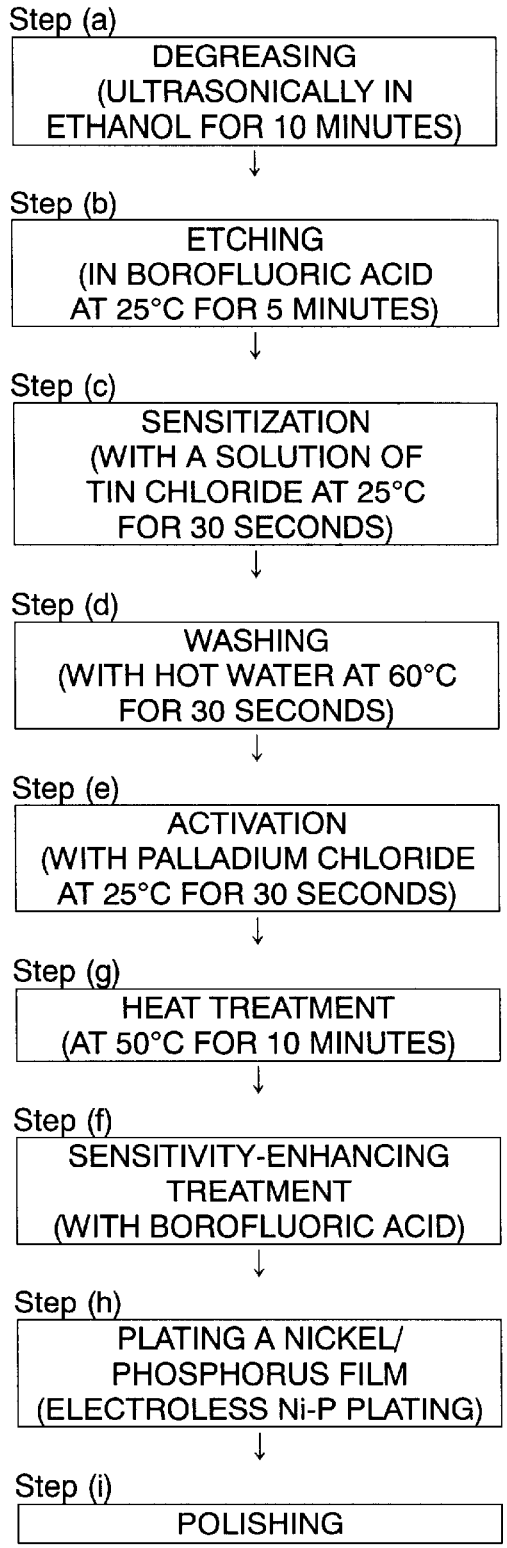
FIG. 14 is a flow diagram for sample 8 of example 2 in the preferred embodiments.

The invention is described in detail hereinunder.

Any type of glass substrates may be processed in the method of the invention, including, for example, those of crystalline glass or sheet glass. Preferred are crystalline glass substrates with high hardness. It is desirable that the substrates have a surface roughness, Ra, of from 0.1 to 0.5 µm. With their surface roughness falling within the defined range, pits that may be formed in the substrates could be minimized.

Prior to being plated, the starting glass substrates are pretreated in an ordinary method comprising at least degreasing, etching, sensitization with tin chloride, activation and sensitivity-enhancing treatment in that order. After having been thus pretreated, they are plated with a nickel/phosphorus film through electroless nickel/phosphorus plating, and then polished to be substrates for magnetic disks.

For degreasing them, it is desirable that the substrates are ultrasonically treated in an organic solvent containing at least one of ethanol, methanol and isopropyl alcohol. Through the degreasing treatment, the water-soluble oil remaining in the hollows in the surface of the substrates could be almost completely removed.

In the invention, the substrates being processed are washed in hot pure water at a temperature of not lower than 50° C. for a period of from 20 to 90 seconds after the step of sensitization with tin chloride. Through the washing treatment, any excess tin could be completely removed from the surface of the substrates and therefore the plating bath could be prevented from being contaminated with tin. However, if the washing treatment is effected at a temperature lower than 50° C. for a period of shorter than 20 seconds, its effect will be poor. On the contrary, if the washing is effected too long over 90 seconds, tin will dissolve away in the washing water and the sensitization with tin will be meaningless. For these reasons, the washing time shall fall within the defined range. More preferably, the washing time falls between 20 and 40 seconds.

In the invention, in addition, the substrates being processed are heated at a temperature of not lower than 70° C. for a period of from 5 to 100 minutes after the step of sensitization with tin but before the nickel/phosphorus plating step. The heat treatment enhances the adhesiveness of tin to the glass substrates through physical adsorption of tin to glass and through thermal diffusion of tin into the glass substrates. If the heat treatment is effected at a low temperature of lower than 70° C. or within a short period of time of shorter than 5 minutes, its effect will be unsatisfactory. On the contrary, even if the heat treatment is effected for a long period of time of longer than 100 minutes, it will be a waste of energy as its effect could not be augmented any more. The heat treatment may be effected in any stage after the sensitization step of applying tin onto the glass substrates. For example, it may be effected between the sensitization step and the washing step with hot pure water, or between the washing step with hot pure water and the activation step, or between the activation step and the sensitivity-enhancing treatment step, or between the sensitivity-enhancing treatment step and the nickel/phosphorus plating step. Preferably, however, the heat treatment is effected after the final pretreatment for plating, or that is, after the sensitivity-enhancing treatment step but before the nickel/phosphorus plating step.

After having been pretreated in the defined manner as above, the glass substrates are subjected to electroless nickel/phosphorus plating in any ordinary manner, and then polished. The glass substrates thus processed according to the method of the invention have few pits.

Preferably, the nickel/phosphorus plate film to be formed on the glass substrates has a thickness of from 8 $\mu$m to 20 $\mu$m. Also preferably, at least 3 $\mu$m of the film is worn away in the subsequent polishing step with the thus-polished plate film thereby having a thickness of at least 5 $\mu$m.

Hereinunder described is one embodiment of the method of the invention for forming a nickel/phosphorus plate film on the surface of a doughnut disk of crystalline glass, which comprises pretreatment steps followed by nickel/phosphorus plating and polishing steps as hereunder.

(a) First, the glass disk is ultrasonically degreased in an organic solvent (ethanol, methanol or isopropyl alcohol). The time for the ultrasonic degreasing is preferably 5 minutes or longer.

(b) The resulting disk is etched for 1 to 10 minutes and preferably 3 to 5 minutes by using a mixture solution of an aqueous solution (bath temperature: room temperature to 80° C., and preferably room temperature to 40° C., concentration: 40 ml/l to 200 ml/l) of borofluoric acid (bath temperature: room temperature to 80° C., and preferably room temperature to 40° C., concentration: 30 ml/l to 500 ml/l) or hydrofluoric acid (bath temperature: room temperature to 60° C., concentration: 30 ml/l to 500 ml/l and preferably 30 ml/l to 100 ml/l) and a fluoride compound such as ammonium fluoride and nitric acid (bath temperature: room temperature to 60° C., and preferably room temperature to 40° C., concentration: 30 ml/l to 500 ml/l).

(c) This is immersed in a bath of a mixed solution of stannous chloride (concentration: 50 g/liter to 150 g/liter, preferably 80 to 120 g/liter) and 38% hydrochloric acid (concentration: 30 ml/liter to 120 ml/liter, preferably 30 to 80 ml/liter) kept at 20° C. to 40° C., for a period of from 20 seconds to 100 seconds, whereby the disk is sensitized.

(d) Excess tin is washed away while the disk is moved in hot pure water at a temperature of not lower than 50° C. The washing time falls between 20 seconds and 90 seconds, preferably between 20 seconds and 40 seconds. The washing water contains tin hydroxide from tin having been released from the disk. If tin oxide existing in the washing water again adheres to the disk, it forms pits in the disk. Therefore, it is desirable to replenish fresh hot pure water with draining the wash waste away.

(e) The disk is activated in an activation bath containing 0.1% of palladium chloride and from 10 to 50 ml/liter of 35% hydrochloric acid (bath temperature: room temperature to 50° C.), for 2 minutes to 10 minutes.

(f) The disk is immersed in a bath of borofluoric acid (bath temperature: room temperature to 80° C., preferably room temperature to 40° C., concentration: 30 ml/liter to 500 ml/liter), for 20 seconds to 80 seconds, whereby its sensitivity is enhanced.

(g) The disk is washed in ethanol, and then heated at a temperature of not lower than 70° C., for a period of from 5 minutes to 100 minutes.

(h) The disk is plated in an electroless nickel/phosphorus plating bath containing from 20 to 50 g/liter of nickel sulfate hexahydrate, from 20 to 100 g/liter of sodium hypophosphite monohydrate, and from 2 to 30 g/liter of ammonium sulfate serving as a complexing agent, and controlled to have a pH of from 4.0 to 5.2, for 40 minutes to 200 minutes, whereby is formed a nickel/phosphorus film on the disk. The plate film formed has a thickness of from 5 to 20 $\mu$m.

(i) After plated, the disk has neither pits nor nodules, and its surface roughness does not differ from the surface roughness (Ra=0.1 to 0.5 $\mu$m) of lapped disks. The disk plated herein is then polished to the level for secondary polishing of magnetic disks. Concretely, it is ground with a rotary duplex-polishing machine having nonwoven abrasive fabric fixed thereto, for which is used a slurry that contains from 5 to 30% of grinding grains of alumina, titania or silica having a grain size of from 0.5 to 2.0 $\mu$m. The grinding pressure is from 30 to 80 g/cm$^2$, and the grinding time falls between 4 minutes and 50 minutes. In that manner, the plated disk is ground to a depth of from 3 to 10 $\mu$m, thereby having a mirror-finished surface. In this process, produced are nickel/phosphorus-plated crystalline glass substrates for magnetic disks. The substrates produced have no pits and have good adhesiveness. They are not damaged by head snapping, and have good impact resistance.

EXAMPLES

Example 1

A doughnut substrate of crystalline glass having an outer diameter of 2.5 inches and a thickness of 0.635 mm and having been subjected to secondary lapping treatment (surface roughness, Ra=0.2 $\mu$m) was ultrasonically degreased in ethanol for 10 minutes (step (a)), etched in borofluoric acid at 25° C. for 5 minutes (step (b)), sensitized in a solution of tin chloride at 25° C. for 30 seconds (step (c)), activated with palladium chloride at 25° C. for 30 seconds (step (e)), and processed with borofluoric acid for enhancing its sensitivity (step (f)). In the process comprising those steps in that order, the substrate was subjected to a step (d) of washing it with hot pure water, for which the condition and the time were varied as in Table 1 below.

Next, the substrate was heated at 80° C. for 10 minutes (step (g)), and then immediately plated in an electroless plating manner to have thereon a 12 $\mu$m-thick nickel/phosphorus plate film (step (h)). Then, this was polished in an ordinary manner using alumina grains having a grain size of from 1 to 5 $\mu$m (step (i)).

In the polishing step, the plate film was ground to a depth of 6 $\mu$m. The thus-polished sample was checked for pits in its surface, and tested for the adhesiveness of the nickel/phosphorus film. From the data, the sample was totally evaluated, as in Table 1.

In Table 1, "" indicates that the samples tested completely satisfy all the requirements defined herein (number of pits=0, adhesiveness: 100/100 in the adhesive tape peeling test, plating failure at edges: zero, swelling: zero); "○" indicates that the samples tested are acceptable as practical substrates (number of pits =1 to 3, adhesiveness: at least 90/100 in the adhesive tape peeling test, plating failure at edges; 1 or 2, swelling: 1 or 2 having a height of not larger than 10 $\mu$m); and "x" indicates that the samples tested are unacceptable as practical substrates (number of pits≧4, adhesiveness: smaller than 90/100 in the adhesive tape peeling test, plating failure at edges; 3 or more, swelling: at least 3 having a height of 10 $\mu$m or larger).

TABLE 1

| Number | Condition | Pits | Adhesion | Overall evaluation |
|---|---|---|---|---|
| Sample 1 | Washed with hot water at 60° C. for 30 seconds after the step (c) | ⊙ | ⊙ | ⊙ |
| Sample 2 | Washed with hot water at 60° C. for 60 seconds after the step (c) | ○ | ⊙ | ○ |
| Sample 3 | Washed with hot water at 60° C. for 30 seconds after the step (e) | X | ○ | X |
| Sample 4 | Washed with hot water at 60° C. for 30 seconds after the step (f) | X | ○ | X |
| Sample 5 | Washed with hot water at 60° C. for 10 seconds after the step (c) | X | ○ | X |
| Sample 6 | Washed with hot water at 60° C. for 150 seconds after the step (c) | X | X | X |

From Table 1, it is seen that the samples which were washed with hot pure water under the condition for temperature and time falling within the defined scope of the invention, after the sensitization step (c) and before the activation step (e) (Sample Nos. 1 and 2), are both excellent. In particular, it is understood therefrom that Sample No. 1 for which the washing time fell between 20 and 40 seconds has no pits and has extremely excellent adhesiveness.

Example 2

The same substrate as in Example 1 was ultrasonically degreased in ethanol for 10 minutes (step (a)), etched in borofluoric acid at 25° C. for 5 minutes (step (b)), sensitized in a solution of tin chloride at 25° C. for 30 seconds (step (c)) washed with hot pure water at 60° C. for 30 seconds (step (d)), activated with palladium chloride at 25° C. for 30 seconds (step (e)), and processed with borofluoric acid for enhancing its sensitivity (step (f)). After the process comprising those steps in that order, the substrate was subjected to a step (g) of heating it, for which the condition and the time were varied as in Table 2 below.

Next, the substrate was plated in an electroless plating manner to have thereon a 12 $\mu$m-thick nickel/phosphorus plate film (step (h)), and then polished in an ordinary manner using alumina grains having a grain size of from 1 to 5 $\mu$m (step (i)).

In the polishing step, the plate film was ground to a depth of 6 $\mu$m. The thus-polished sample was checked for pits in its surface, and tested for the adhesiveness of the nickel/phosphorus film. From the data, the sample was totally evaluated, as in Table 2.

In Table 2, the same meanings as in Table 1 apply to "", "○" and "x".

TABLE 2

| Number | Condition | Pits | Adhesion | Overall evaluation |
|---|---|---|---|---|
| Sample 1 | Treated at 80° C. for 10 minutes after the step (f) | ⊙ | ⊙ | ⊙ |
| Sample 2 | Treated at 80° C. for 10 minutes after the step (c) | ○ | ○ | ○ |
| Sample 3 | Treated at 80° C. for 10 minutes after the step (d) | ○ | ○ | ○ |
| Sample 4 | Treated at 80° C. for 10 minutes after the step (e) | ○ | ○ | ○ |
| Sample 5 | Treated at 50° C. for 10 minutes after the step (f) | X | X | X |
| Sample 6 | Treated at 150° C. for 10 minutes after the step (c) | ○ | ○ | ○ |
| Sample 7 | Treated at 80° C. for 3 minutes after the step (f) | X | X | X |
| Sample 8 | Treated at 50° C. for 10 minutes after the step (e) | X | X | X |

From Table 2, it is seen that the samples which were heated under the condition for temperature and time falling within the defined scope of the invention, after the sensitization step (c) and before the electroless nickel/phosphorus plating step (h) (Sample Nos. 1 to 4, and 6), are all excellent. In particular, it is understood therefrom that Sample No. 1 which was heated after the sensitivity-enhancing step (f) has no pits and has extremely excellent adhesiveness.

As in Examples mentioned above, so far as glass substrates of, for example, crystalline glass or sheet glass are plated with a nickel/phosphorus film according to the method of the invention, any excessive tin does not remain on the surface of the glass substrates being processed, or is prevented from being caught by the plate film formed on the substrates. In particular, in the method of the invention, the substrates to be plated are subjected to suitable heat treatment prior to the plating step, whereby tin is thermally diffused into the substrates to enhance the adhesiveness of the nickel/phosphorus plate film formed on the substrates, and, in addition, the plated substrates are prevented as much as possible from having pits on their surface. Accordingly, the method of the invention is extremely favorable to commercial production of magnetic disk substrates for which the demand is much increasing with the recent popularization of notebook-sized or mobile computers where the head is located much nearer to the magnetic disk substrate.

In the method of the invention, where the degreasing step is effected ultrasonically in an organic solvent that contains at least one of ethanol, methanol and isopropyl alcohol, no oil shall remain on the surface of the degreased substrates. In that case, the substrates having no oil on their surface are plated well, and the nickel/phosphorus-plated substrates have little pits.

Where the specific heat treatment is effected after the sensitivity-enhancing step in the method of the invention, the adhesiveness of the nickel/phosphorus plate film to the substrates is much more increased.

Although the present invention has been described based on the preferred embodiment, the terms and the sentences used in this specification are explanatory, and not limiting the present invention. It should be appreciated that there are many modifications and substitutions without departing from the spirit and scope of the present invention.

What is claimed is:

1. A method for producing magnetic disk substrates, which comprises subjecting glass substrates to at least steps of degreasing, etching, sensitization with tin chloride, activation and sensitivity-enhancing treatment in that order, then pretreated substrates with a nickel/phosphorus film, and thereafter polishing the plated substrates, the substrates being processed are washed with hot pure water at a temperature of not lower than 50° C. for a period of from 20 to 90 seconds, after the sensitization step but before the activation step, and the substrated being heated at a temperature of not lower than 70° C. for a period of from 5 to 100 minutes, after the sensitization step but before the nickel/phosphorus-plating step.

2. The method for producing magnetic disk substrates as claimed in claim 1, wherein the time for the step of washing the substrates with hot pure water falls between 20 and 40 seconds.

3. The method for producing magnetic disk substrates as claimed in claim 1, wherein the degreasing step is effected ultrasonically in an organic solvent wherein the organic solvent is selected from the group consisting of ethanol, methanol and isopropyl alcohol.

4. The method for producing magnetic disk substrates as claimed in claim 1, wherein the heat treatment step is effected after the sensitivity-enhancing treatment step.

5. The method for producing magnetic disk substrates as claimed in claim 1, wherein the heat treatment step is effected between the sensitization step and the step of washing with hot pure water.

6. The method for producing magnetic disk substrates as claimed in claim 1, wherein the heat treatment step is effected between the step of washing with hot pure water and the activation step.

7. The method for producing magnetic disk substrates as claimed in claim 1, wherein the heat treatment step is effected between the activation step and the sensitivity-enhancing treatment step.

8. The method for producing magnetic disk substrates as claimed in claim 1, wherein the glass substrates are of crystalline glass.

9. The method for producing magnetic disk substrates as claimed in claim 1, wherein the glass substrates have a surface roughness, Ra, of from 0.1 to 0.5 $\mu$m.

* * * * *

UNITED STATES PATENT AND TRADEMARK OFFICE
CERTIFICATE OF CORRECTION

PATENT NO. : 6,378,338 B1
DATED : August 30, 1999
INVENTOR(S) : Kurata Awaya et al.

It is certified that error appears in the above-identified patent and that said Letters Patent is hereby corrected as shown below:

Column 7,
Line 35, before "pretreated" insert -- plating the --.
Line 37, after "being" delete "processed are".
Line 38, after "C" delete ".".

Column 8,
Line 3, delete "substrated" and substitute therefor -- substrates --.
Line 4, after "C" delete ".".

Signed and Sealed this

Twenty-second Day of October, 2002

Attest:

Attesting Officer

JAMES E. ROGAN
Director of the United States Patent and Trademark Office